Patented Aug. 30, 1949

2,480,551

UNITED STATES PATENT OFFICE 2,480,551

HYDROLYZED INTERPOLYMER OF ETHYLENE, VINYL ACETATE, AND DIETHYL FUMARATE

Donald D. Coffman and Henning W. Jacobson, Wilmington, Del., assignors to E. I. du Pont de Nemours & Company, Wilmington, Del., a corporation of Delaware No Drawing. Application May 30, 1945, Serial No. 596,806

4 Claims. (Cl. 260—78.5)

This invention relates to heat-hardenable resins, to heat-hardenable hydrolyzed ethylene vinyl ester/fumaric ester interpolymers, and especially to hydrolyzed ethylene/vinyl acetate/diethyl fumarate interpolymers in which the mole ratio of ethylene to vinyl acetate is at least 1:1 and the mole ratio of vinyl acetate to diethyl fumarate is greater than 2:1.

The low cost of ethylene has stimulated the preparation and characterization of a wide variety of ethylene interpolymers. Three component polymers of ethylene with vinyl esters and esters of unsaturated dibasic acids are known, but in common with certain other ethylene interpolymers these are soft, low-melting products with poor resistance to organic solvents and cannot be hardened by mild heat treatment. These properties are distinctly disadvantageous in applications such as molded articles, fibers, tubes and other uses in which a combination of high softening temperature and insolubility is desired. The problem presented therefore was that of obtaining an interpolymer of ethylene which could be cured by heat treatment to insoluble, high softening products for use in such applications.

An object of the present invention is to provide heat-hardenable, hydrolyzed interpolymer resins. Another object is to provide from ethylene, vinyl acetate and diethyl fumarate, resins that may be cured by heat treatment to give insoluble, high-softening moldable products. Yet another object is to provide processes for obtaining the interpolymer, hydrolyzing the interpolymer and molding it to an insoluble, high-softening resin. Other objects and advantages of the invention will hereinafter appear.

The objects of this invention are accomplished by the hydrolyzed ethylene/vinyl acetate/diethyl fumarate interpolymers prepared by interpolymerizing ethylene with vinyl acetate and diethyl fumarate followed by hydrolysis, and more particularly by hydrolysis of interpolymers in which the mole ratio of ethylene to vinyl acetate is at least 1:1 and the mole ratio of vinyl acetate to diethyl fumarate is greater than 2:1. Quite unexpectedly, interpolymers in this preferred range are distinctly superior to interpolymers wherein hydroxyl and carboxyl groups are present in equivalent quantities as regards solubility in organic solvents and properties of films and filled moldings. Moreover, these preferred polymers can be cured to high-softening moldings of outstanding properties; and furthermore, heat treatment of films and fibers of these preferred polymers gives rise to tough, insoluble, high-softening products.

Three component interpolymers of ethylene, vinyl acetate and diethyl fumarate are prepared by heating the constituents in bulk, solution or emulsion with a dissolved or suspended vinyl polymerization catalyst to a temperature above 40° C. under superatmospheric pressure. The general method of operation is described in the Roland et al. U. S. Patent 2,386,347. The following procedure will illustrate a suitable general method of preparation.

A pressure vessel is charged with vinyl acetate and diethyl fumarate in approximate amounts desired in the final interpolymer and a vinyl polymerization catalyst such as benzoyl peroxide. The vessel is closed, placed in a shaker machine provided with a heater, and is connected with a source of ethylene under pressure. Temperature recording and controlling thermocouples are inserted, and heating and agitation are begun. When a temperature of 50°–150° C. is recorded, the pressure is adjusted to between 60 and 1500 atmospheres of ethylene pressure. After a brief induction period reaction begins and the pressure drops due to the polymerization of ethylene. The reaction is carried out in the desired pressure range by periodic repressuring with ethylene. At the end of the polymerization, as evidenced by cessation of pressure drop, the pressure vessel is cooled, bled of unreacted gases, opened, and discharged. The interpolymer is generally freed of vinyl acetate and diethyl fumarate by steam distillation and is dried under reduced pressure.

The interpolymers may be hydrolyzed by the general methods described in U. S. Patent 2,386,347. The following procedure will illustrate a suitable method of hydrolysis.

The interpolymer is dissolved in a suitable solvent, as for example, a mixture of an aromatic hydrocarbon such as benzene and an alcohol such as methanol. To the hot solution is added in excess an alcoholic solution of alkali such as methanolic potassium hydroxide. The resulting solution is refluxed for a period of 1 to 4 hours, at which time the reaction mixture is poured into water containing hydrochloric acid in excess over that required to neutralize the alkali, and organic solvents are then conveniently removed by steam distillation. The hydrolyzed polymers are generally not completely dried since this often leads to complete insolubilization.

In making filled moldings of hydrolyzed ethylene/vinyl acetate/diethyl fumarate interpolymers the usual methods for incorporation of filler into the polymer may be employed. Some of these comprise milling the filler with the polymer or suspending the filler in a solution of the polymer followed by evaporation of the solvent.

The molding operation can be carried out over a range of temperature and pressure, but in general a 10–15 minute period under a pressure of 2000–3000 lb./sq. in. at a temperature at 150° C. is satisfactory. It would be expected that hydrolyzed polymers containing an equivalent number of carboxyl or hydroxyl groups would lead to the strongest, highest tensile, impact, and flexural strength, but this is not the case. The preferred hydrolyzed polymers, that is, hydrolysis products of compositions in which the mole ratio of ethylene to vinyl acetate is at least 1:1 and the mole ratio of vinyl acetate to diethyl fumarate is greater than 2:1, give moldings superior to compositions outside this range. This may readily be seen by comparing the properties of moldings of a hydrolyzed ethylene/vinyl acetate/diethyl fumarate of 1.8:1:0.07 mole ratio with one in which the mole ratio is 2.6:2:1 as shown in the appended Table I. Moldings of both compositions contain 50% by weight of wood flour and were molded at 2000 lb./sq. in. at 150° C. These resins are also compared with a phenolic resin.

TABLE I

Moldings of HE/VA/DEF interpolymers

| Polymer | Mol Ratio | Softening Pt., °C. | Tensile Strength (p. s. i./%) | Hardness (Rockwell M) | Stiffness (sag) | Flexural (p. s. i.) | Impact (ft. lb./in. notch) |
|---|---|---|---|---|---|---|---|
| HE/VA/DEF | 1.8/1/0.07 | 160 | 5,830/0 | 60 | 1.21 | 9,675 | 0.54 |
| Phenolic [1] | | 150–up | 5,000/0 | 90–120 | 0.6–0.8 | 10,000 | 0.35 |
| HE/VA/DEF | 2.6/2/1 | 95 | 5,620/0 | 54 | 1.08 | 9,000 | 0.32 |

[1] Average properties of Durez-type phenolics.

Hydrolyzed ethylene/vinyl acetate/diethyl fumarate interpolymers can be formed into films by methods such as solvent casting or hot pressing. Here again hydrolyzed polymers in the preferred range are far superior to compositions outside this range as regards general film properties. Thus, a hydrolyzed ethylene/vinyl acetate/diethyl fumarate of 1.8:1:0.07 is readily hot cast or pressed to films with a tensile strength of 2800 lb./sq. in. and an elongation of 40%. The softening point of the film is 120° C. and the temperature at which the tensile strength becomes zero is 112° C. By heating for 6 hours at 105° C., the softening point is increased to 200° C. and the zero tensile strength temperature is increased to 165° C. Hydrolyzed compositions wherein the mole ratio of vinyl acetate to diethyl fumarate in the original interpolymer is 2:1 are hard, brittle, difficultly soluble in organic solvents and cannot be easily manipulated. The following examples serve to illustrate the process of this invention. Quantities given are expressed as parts by weight unless otherwise indicated.

EXAMPLE 1

(A) *Interpolymer preparation*

A silver-lined pressure vessel is charged with 150 parts of vinyl acetate, 17 parts of diethyl fumarate, and 0.3 part of benzoyl peroxide. The vessel is closed, evacuated, and pressured with ethylene. Heating and agitation are begun and a temperature of 63°–67° C. is maintained for a period of 10 hours during which time the ethylene pressure is maintained at 840–1000 atmospheres. When the pressure ceased to drop, indicating the end of the reaction, the vessel is cooled, bled of excess ethylene, opened and discharged. The polymer is freed of vinyl acetate and diethyl fumarate by steam distillation. There is obtained on drying 98 g. of tough, strong elastomeric ethylene/vinyl acetate/diethyl fumarate interpolymer which, as indicated in the section below has an ethylene/vinyl acetate/diethyl fumarate mole ratio of 1.8:1:0.07.

(B) *Interpolymer hydrolysis*

Forty-five parts of interpolymer, prepared as described above, is dissolved in 400 parts of benzene at reflux with stirring. A solution of 30 parts of potassium hydroxide in 300 ml. of methanol is added dropwise to the refluxing solution, and heating is continued for 4 hours. At the end of this time, the product is poured into a large volume of water containing 40 parts of concentrated hydrochloric acid. The polymer which separates is washed with water several times and sucked dry.

The original unhydrolyzed polymer has a carbon content of 65.51%. By titration of the completely hydrolyzed interpolymer in hot tertiary-butyl alcohol to the phenolphthalein end point it is found that 0.1710 g. of polymer requires 2.28 ml. of 0.1007 N sodium hydroxide for complete neutralization. From this it may be calculated that the ethylene/vinyl acetate/diethyl fumarate mole ratio is 26.2:14.1:1 or 1.8:1:0.07.

(C) *Molding of hydrolyzed interpolymer*

Ten parts of hydrolyzed interpolymer as obtained from the preceding step is dissolved in tertiary-butyl alcohol with stirring at reflux temperature and then 10 parts of wood flour is added. The solvent is removed by slow evaporation with good agitation. The homogeneous paste of interpolymer and wood flour thus formed is heated for a short period of time on the steam bath under reduced pressure to remove the remaining solvent, and is molded at 150° C. under 2000 lb./sq. in. pressure for 10 minutes. These moldings possess the following properties. Methods for testing are decribed in publications referred to in parenthesis.

Softening point—160° C. (copending application S. N. 479,894, now U. S. Patent No. 2,450,000)
Stiffness—1.21 mm. sag.
Hardness (Rockwell M)—60
Tensile strength—5830 lb./sq. in. (ASTM D–638–42T)
Elongation at break point—0% (ASTM D–638–42T)
Impact strength—0.540 ft. lb./in. notch (ASTM D–256–41T)
Flexural strength—9675 lb./sq. in. (ASTM D–650–42T)

Example 2

(A) Interpolymer preparation

A silver-lined pressure vessel is charged with 20 parts of vinyl acetate, 20 parts of diethyl fumarate, 100 parts of tertiary-butyl alcohol and 0.3 part of benzoyl peroxide. The vessel is closed, pressured with ethylene and is heated to a temperature of 64°–68° C. with good agitation. For the reaction period of 8.25 hours the ethylene pressure is maintained at 840–990 atmospheres and there is an observed pressure drop of 250 atmospheres. At the end of this time the pressure ceases to drop and the vessel is cooled, bled of excess gas, opened and discharged. The product thus obtained is freed of solvent and of excess vinyl acetate and diethyl fumarate by steam distillation. Upon drying there is obtained 22 g. of a clear, strong elastomer containing 64.05% carbon, from which it may be calculated by assuming that the vinyl acetate and diethyl fumarate polymerize in the mole ratio in which they are charged (e. g. two moles vinyl acetate to one mole of diethyl fumarate), that the mole ratio of ethylene to vinyl acetate to diethyl fumarate is 4.7:2:1.

(B) Interpolymer hydrolysis

Twenty-two parts of the above-described interpolymer is dissolved in 250 g. of benzene at reflux with stirring and 75 parts of methanol is added. Then 25 parts of potassium hydroxide in 125 ml. of methanol is added. The mixture is refluxed for about 4 hours and poured into 1000 parts of water containing 25 parts of concentrated hydrochloric acid. The precipitated hydrolyzed ethylene/vinyl acetate/diethyl fumarate polymer of 4.7:2:1 mole ratio is steamed to remove benzene. During this procedure the polymer shows a tendency to emulsify. It is precipitated by addition of sodium chloride after all benzene has been removed and is finally washed with cold water.

(C) Molding of hydrolyzed interpolymer

The hydrolyzed interpolymer prepared as described above, is filled with wood flour and molded as described in Example 1. These moldings are found to have the following properties by methods referred to in Example 1.

Softening point—80° C.
Stiffness—1.56 mm.
Tensile strength—3510 lb./sq. in.
Per cent elongation at break—5%
Impact strength—0.480 ft. lb./in. of notch
Flexural strength—6650 lb./sq. in.

This invention relates to heat-hardenable hydrolyzed ethylene/vinyl acetate/diethyl fumarate resins. By varying the ratio of ethylene to vinyl acetate to diethyl fumarate in the polymerization charge, a wide variety of ethylene/vinyl acetate/diethyl fumarate interpolymers can be obtained. These products, in turn, on hydrolysis give compositions which show a great variation in properties depending on the mole ratio of the polymer constituents in the unhydrolyzed polymer. Hydrolyzed products with a high ratio of ethylene to vinyl acetate and diethyl fumarate, such as 25:2:1, are soft and pliable. On heating such polymers they become insoluble and higher softening but retain their soft, pliable characteristics. Polymers wherein the mole ratio of vinyl acetate to diethyl fumarate is 2/1 but wherein the mole ratio of ethylene is much lower than in those described above, as for example 4:2:1, are generally quite hard and brittle. Heat treatment causes complete insolubilization. The preferred hydrolyzed ethylene/vinyl acetate/diethyl fumarate interpolymers are those wherein the ratio of ethylene to vinyl acetate is at least 1:1 but less than 12:1 and the mole ratio of vinyl acetate to diethyl fumarate is between 2:1 and 50:1 and preferably less than 30:1. Hydrolyzed interpolymers in this range, as for example 1.8:1:0.07, are tough and pliable and give outstandingly superior filled moldings, films and fibers.

The ethylene used in the preparation of the interpolymers, as utilized in carrying out this invention, may be from any source, but for the best results it should be purified before use. Low proportions of methane, ethane, nitrogen, hydrogen and oxygen may be tolerated. Because ethylene polymerizations in general are affected by the concentration of oxygen present, this substance should be low in concentration, and preferably below 50 P. P. M. for ease of interpolymerization.

The vinyl acetate and diethyl fumarate used in the practice of this invention should be of a good grade and are generally distilled prior to use to remove inhibitors and impurities.

The temperature employed in the polymerization step may be from 40°–300° C., but it is preferred to keep the temperature at about 65° C. for at this temperature a sufficiently rapid and easily controlled reaction is obtained.

The pressures employed for interpolymer preparation may vary from 60 to 1000 atms. of ethylene and upwards depending chiefly on the strength of the equipment. The higher pressures are preferable, since under these conditions products of higher molecular weight are obtained.

Catalysts useful for the preparation of ethylene/vinyl acetate/diethyl fumarate interpolymers are those known to induce the polymerization of ethylene and include oxygen at low concentrations, organic peroxy compounds of the class of diacyl peroxides such as benzoyl peroxide, dialkyl peroxides such as diethyl dioxide, and alkyl hydroperoxide such as tertiary butyl hydroperoxide; perchloro compounds such as hexachloroethane, salts of halogenated aromatic sulfonamides such as chloramine T, hydrazine derivatives such as dibenzoyl hydrazine and other agents capable of liberating free radicals.

Agitation is preferred for the interpolymerizations which may be carried out batchwise, semicontinuously or continuously in equipment capable of withstanding the pressures developed. It is preferable to have that portion of the equipment which comes in direct contact with the reactants and the interpolymers lined with the material which will not corrode or influence the course of the polymerization. Suitable materials include silver, aluminum, tin, glass, stainless steel monel metal, and nickel.

Alkaline conditions are generally employed in carrying out the hydrolysis of ethylene/vinyl acetate/diethyl fumarate interpolymers since under such conditions rapid and complete hydrolysis is affected. Since the unhydrolyzed polymers are soluble in aromatic hydrocarbon solvents it is convenient to carry out the hydrolysis by adding an alcoholic solution of an alkali to a solution of the polymers in the hydrocarbon. The hydrocarbon solution may also be diluted with the alcohol before addition of the alkali with good results. Benzene, toluene and xylene may be mentioned as examples of suitable solvents while methanol and ethanol serve well as diluents and solvents for the alkali which may be for example, potassium hydroxide or sodium hydroxide. The temperature of hydrolysis may be varied depending upon the rapidity of hydrolysis desired but ordinarily the temperature used coincides with the reflux temperature of the particular system used. The quantity of alkali added is not critical as long as an excess is used. Generally a 10% excess promotes a rapid and complete hydrolysis.

In making filled moldings of hydrolyzed ethylene/vinyl acetate/diethyl fumarate interpolymers a variety of fillers such as asbestos, mica, carbon, cork, chalk or wood flour may be used. If colored moldings are desired suitable pigments may be added. Molding temperatures, pressures and times may be varied. Generally a temperature of about 150° C. is sufficiently high to cause the molding composition to flow properly and at the same time to bring about the hardening process in a reasonable length of time, usually from 10 to 15 minutes. Pressures of 2000-3000 lb./sq. in. are sufficient to give compact dense moldings under these conditions.

We claim:

1. A heat-hardenable resin of a completely hydrolyzed interpolymer of ethylene, vinyl acetate and diethyl fumarate having a mole ratio of ethylene to vinyl acetate between 1:1 and 12:1 and between 8.1 and 33.3% by weight of the unhydrolyzed diethyl fumarate.

2. Heat-cured insoluble resin of a completely hydrolyzed interpolymer of ethylene, vinyl acetate and diethyl fumarate having respectively a mole ratio of 1.8:1:0.07.

3. Heat-cured insoluble resin of a completely hydrolyzed interpolymer of ethylene, vinyl acetate and diethyl fumarate having respectively a mole ratio of 2.6:2:1.

4. Heat-cured insoluble resin of a completely hydrolyzed interpolymer of ethylene, vinyl acetate and diethyl fumarate having respectively a mole ratio of 4.7:2:1.

DONALD D. COFFMAN.
HENNING W. JACOBSON.

REFERENCES CITED

The following references are of record in the file of this patent:

UNITED STATES PATENTS

| Number | Name | Date |
|---|---|---|
| 1,945,307 | Dykstra | Jan. 30, 1934 |
| 2,182,316 | Hopff et al. | Dec. 5, 1939 |
| 2,200,429 | Perrin et al. | May 14, 1940 |
| 2,339,184 | Neher et al. | Jan. 11, 1944 |
| 2,378,629 | Hanford | June 19, 1945 |
| 2,396,785 | Hanford | Mar. 19, 1946 |
| 2,411,474 | Stevenson | Nov. 19, 1946 |